United States Patent [19]

Kelman

[11] Patent Number: 5,208,916
[45] Date of Patent: May 11, 1993

[54] SUNGLASS ASSEMBLY FOR VISORED HEADGEAR

[76] Inventor: Charles D. Kelman, 721 Fifth Ave., New York, N.Y. 10022

[21] Appl. No.: 931,067

[22] Filed: Aug. 17, 1992

[51] Int. Cl.⁵ .................................................. A61F 9/00
[52] U.S. Cl. .................................................. 2/10; 2/199; 351/155
[58] Field of Search ................. 2/9, 10, 12, 15, 185 R, 2/199, 422, 424; 351/155

[56] References Cited
U.S. PATENT DOCUMENTS 1,182,734  5/1916  Baker ......................................... 2/10
1,829,538  10/1931  Prichard ..................................... 2/10

Primary Examiner—Clifford D. Crowder
Assistant Examiner—Diana L. Biefeld
Attorney, Agent, or Firm—Darby & Darby

[57] ABSTRACT

A sunglass assembly for attachment to a headgear includes mounting means for removable attachment to the front of the headgear at a visor, brim or the like. A pair of parallel rail means attach to the mounting means and extend in the direction of the wearer's frontal line of vision. A sunglass member has a tinted transparent portion for viewing therethrough, is connected to slides which frictionally and slidingly engage the rail means. The sunglass member is pivotably attached to the slides and is able to translate along the rails toward and away from the user and to tilt up out of the user's line of vision.

16 Claims, 2 Drawing Sheets

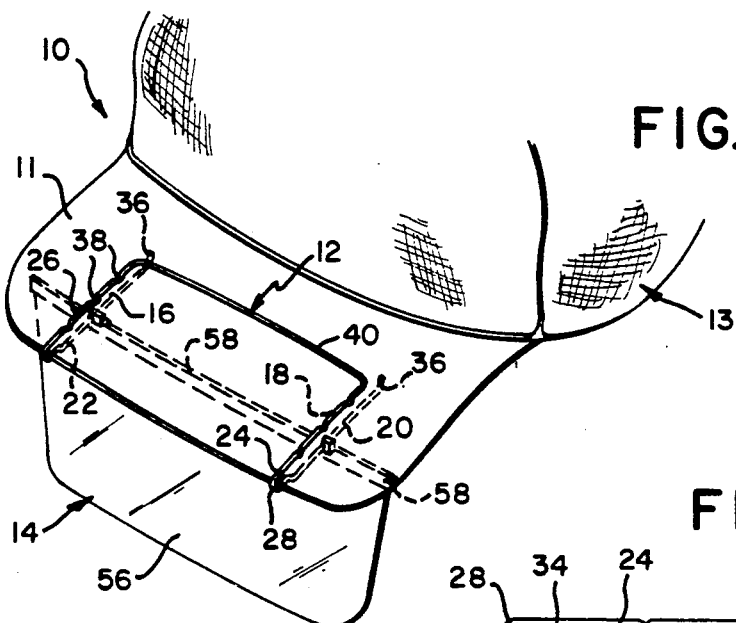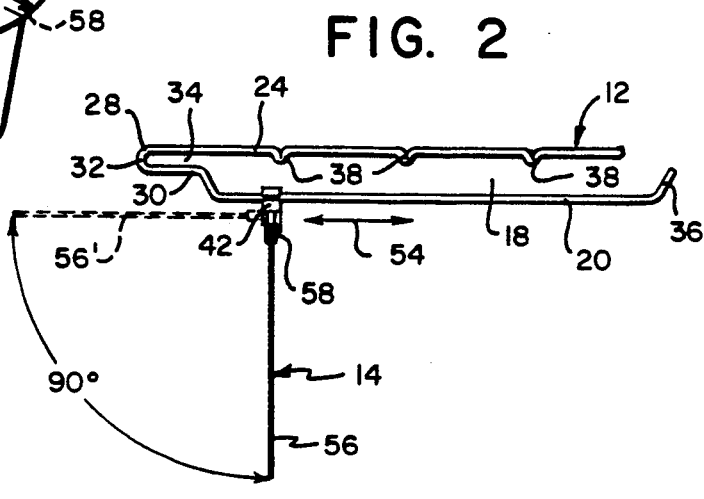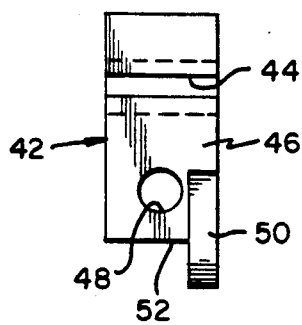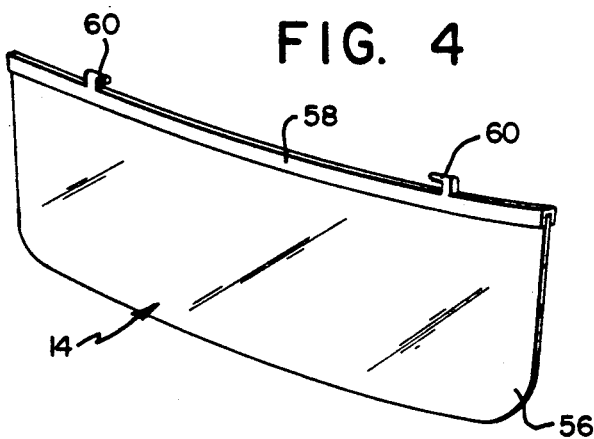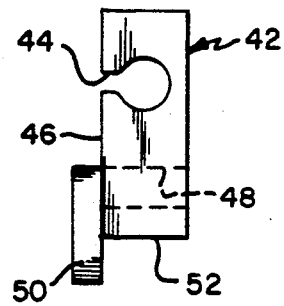

SUNGLASS ASSEMBLY FOR VISORED HEADGEAR

BACKGROUND OF THE INVENTION

This invention relates generally to sunglasses and more particularly to sunglasses that are adjustably and removably attachable to the visor of a person's cap or the brim of a hat.

The need for sunglasses and disadvantages associated with conventional sunglasses are well known. Most sunglasses are similar to conventional eyeglasses or spectacles. There is generally a main frame, which includes a pair of lenses or a single continuous lens, and a pair of temple bars at opposite sides of the main frame. The temple bars rest on the wearer's ears or partially encircle the ears from above; the center of the main frame is adapted to rest on the user's nose. The temple bars are hinged to the main frame for folding into a position substantially parallel with the main frame or the temple bars may be at right angles to the main frame for wearing.

Such sunglasses, including a main frame and temple bars are not convenient for use when playing golf. Typically golfers wear caps with visors. The standard sunglasses interfere with proper seating of the golf caps and vice versa. Also, in playing golf the player frequently moves his head up and down, i.e., before, during, and after, a swing. In addition, individual golfers have different facial and eye characteristics and have varying habits. Thus, the optimum position of sunglasses varies from golfer to golfer.

In the prior art, adaptions of conventional sunglasses have been made wherein the temple bars were eliminated and the main frame, with the desired tinted lenses, was attached to the headgear of the user. In many instances, these devices have the disadvantage of permanent attachment to the headgear, such that the sunglasses are always present, even when the need for sunglasses is absent. The sunglasses cannot be readily placed on a new cap when caps are changed. Also, some of the prior art pivotable sunglasses were so complex in construction and heavy that the cost of the pivot device could outweigh usefulness.

In many of the earlier devices, the distance between the sunglass frame and the user's eyes was not adjustable. This is of course disadvantageous as many users have a preference for such positioning of sunglasses.

What is needed is a relatively inexpensive, lightweight mounting for sunglasses that is simple and easily attached to a cap visor or to the brim of a hat. Advantageously, such device should provide lens tilting, readily adjustable spacing between the sunglass and the user's face, and simple attachment to the cap or hat without need for complex or expensive components.

SUMMARY OF THE INVENTION

It is an object of the invention to provide an improved sunglass assembly for visored headgear that has a construction which allows simple attachment to the headgear and is inexpensive to produce.

It is a further object of the invention to provide an improved sunglass assembly for visored headgear that permits positioning of the lens frame at any selected distance from the user's face within a predetermined range.

Another object of the invention is to provide an improved sunglass assembly for visored headgear that provides flip-up capability for the tinted lenses, whereby use of the sunglass feature may be interrupted without removing the sunglasses from the user's headgear.

Yet another object of the invention is to provide an improved sunglass assembly for visored headgear that provides both flip-up capability and adjustable positioning relative to the user's eyes in a simple low cost lightweight device.

A sunglass assembly for attachment to a headgear in accordance with the invention includes mounting means for removable attachment to the front of the headgear at a visor, brim or the like. A pair of parallel rail means attach to the mounting means and extend in the direction of the wearer's frontal line of vision.

A sunglass member having a tinted transparent portion for viewing therethrough is connected to sliding means which frictionally and slidingly engage the rail means. The sunglass member is pivotably attached to the sliding means and the sunglass member is able to both translate along the rails toward and away from the user and also to tilt up out of the user's line of vision.

Another advantage of the sunglass assembly for visored headgear in accordance with the invention is that even though lightweight and adjustable a rigid structure is nevertheless provided.

Further objects and advantages of the invention will be apparent from the following detailed description and drawings The invention, accordingly, comprises the features of construction, combination of elements, and arrangement of parts which will be exemplified in the constructions hereinafter set forth, and the scope of the invention will be indicated in the claims.

BRIEF DESCRIPTION OF THE DRAWING

For a fuller understanding of the invention, reference is had to the following description, taken in connection with the accompanying drawings, in which:

FIG. 1 is a top perspective view of a sunglass assembly in accordance with the invention, attached to a visored cap;

FIG. 2 is a side elevational view of the sunglass assembly of FIG. 1;

FIGS. 3a and 3b are front and side elevational views, respectively, of a slide used in the sunglass assembly of FIG. 1;

FIG. 4 is a top perspective view of a lens used in the sunglass assembly of FIG. 1;

DESCRIPTION OF THE PREFERRED EMBODIMENTS

Figure 5:
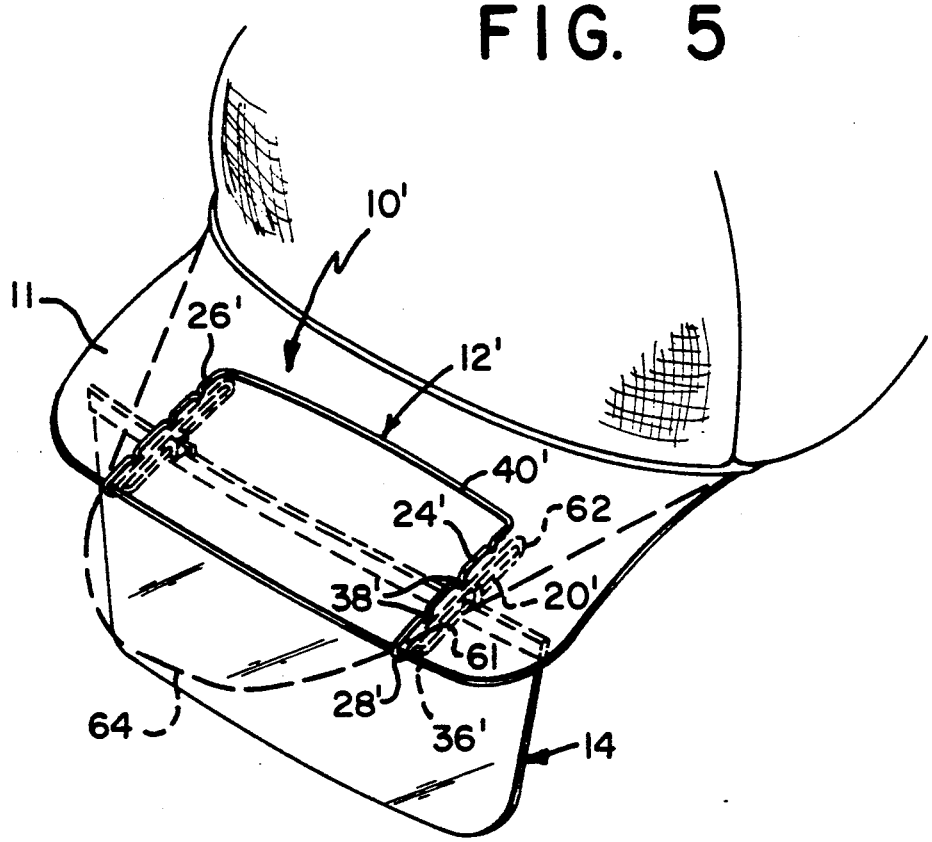
FIG. 5 is a view similar to FIG. 1 of an alternative embodiment of a sunglass assembly in accordance with the invention.

With reference to FIGS. 1-4, a sunglass assembly 10 in accordance with the invention includes a mounting bracket 12 and a sunglass member or frame assembly 14, which may be a single sheet of curved, tinted plastic or glass, or may be a pair of individual tinted lenses surrounded by a rigid supporting frame (not shown) as in conventional eyeglasses and sunglasses. The sunglass assembly 10 is illustrated as attached to the visor 11 of a cap 13 or headgear.

The mounting bracket 12 is a continuous, resilient rod that is formed into a pair of lobes 16,18. Each lobe includes a lower rail 20,22 and a gripping rail 24,26, which rails are substantially parallel to each other. A return bend 28 links the gripping rail 24 to the lower rail 20 of the lobe 18. The lobe 16 is similarly constructed and will not be described in detail.

The return bend 28 includes a step 30 that provides a protruding nib at the closed end of the lobe. The rail 20 and the gripping rail 24 converge slightly in the direction away from the extreme tip 32 of the return bend 28 so as to create a pinching neck 34 between these two elements at the location where the step 30 begins. Thus, as described more fully hereinafter, the visor 11 of the headgear 13 can be frictionally and firmly clasped at the nib by the sunglass assembly 10 in accordance with the invention, when the assembly is mounted on the headgear, as illustrated in FIG. 1.

Guards 36 are extensions of the free ends of the lower rails 20,22 and are turned, in any direction, from the direction of the associated rail. An upward turn as illustrated in FIGS. 1,2 is preferred. This guard 36, protects a wearer from possible facial injury, should the visor 11 on the cap 13 be deflected downward or pushed toward the face of the wearer. Grips 38 extend from the gripping rails 24,26 and engage the upper surface of the visor 11 when the sunglass assembly 10 is attached to the headgear 13 so as to prevent easy movement of the sunglass assembly 10 relative to the visor. The grips 38, as illustrated, may be pointed so as to better engage the upper visor surface, or the grips 38 may represent a roughness on an undersurface of the gripping rails 24,26.

A link 40 joins the two lobes 16,18. The entire mounting bracket 12 can be formed of resilient wire that is formed, e.g. bent to shape, in a one-piece construction. The grips 38 can be formed on the wire by applied pressure using shaped opposed dies. The mounting bracket 12 can also be made of resilient plastic, which, for example, may be molded to a final shape, or the bracket 12 may be formed by bending and forming an elongated rod of plastic.

Slides 42 are slidingly attached to the lower rails 20,22 on each lobe 16–18. The slides are generally rectangular and include a groove 44 formed into a side surface 46. The groove is narrower at its entrance (FIG. 3b) than the rails 20,22 and is formed of a resilient plastic such that the slide 42 is attached to a lower rail 20,22 by pressing the rail into the groove 44, where it is slidingly received. The slides, can be moved along the respective rails by sliding to positions close to the nib or step 30 or close to the guard 36, or may be placed anywhere therebetween.

The guard 36 by its angled relationship to the rail 20,22 prevents the slide 42 from inadvertently separating from the lower rail. The groove 44 is located substantially at one vertical end of the slide 42 (FIGS. 3a,b). At the other lower end, and oriented transversely to the groove 44, is a through opening 48. Also, adjacent to the opening 48 is a stop 50 that projects from the side surface 46 and below the lower end 52 of the slide 42.

The sunglass frame assembly 14 includes a single-piece lens 56 constructed, for example, from tinted or coated plastic that is attached to a one-piece bar frame 58. It is well understood that the sunglasses, in themselves, can take many shapes and have two lenses held on a supporting frame. It is also possible that the sunglass is a transparent single-piece of tinted plastic or glass that has no frame that is separable from the lens portion itself. All of these different configurations for sunglasses can be adapted in construction to become part of the present invention.

A pair of coaxial cylindrical pins 60 are mounted above the frame 58, with a spacing between the pins 60 corresponding to the spacing between the lobes 16,20 on the mounting bracket 12. The pins 60 have a diameter permitting frictional entry into the openings 48 in the slides 42.

The sunglass assembly 10 is easily assembled by inserting the pins 60 into the openings 48 of a pair of slides and then connecting a slide to each of the lower rails 20,22 by pressing the rail into a respective groove 44 on the slide 42.

Alternatively, the opening 48 and the pin 60 may be contoured so that the slides 42 may be attached to the respective lower rails 20,22 and then the sunglass frame assembly 14 is attached by insertion of the pin 60 into the openings 48 while the lower ends 52 of the slides 42 are angled, by pivoting on the rails 20,22 toward each other.

As illustrated in FIG. 2, the lens 56 (solid line) can be substantially at a right angle to the sliding rail 20 or may be pivoted on the pin 60 to a position (broken line) that is substantially parallel to the rail 20. When the assembly 10 is attached to the visor 11 (FIGS. 1,2), the lens 56 can extend (solid line) perpendicularly to the rail 20, or by pivoting about the pins 60 to a position indicated at 56' (broken line) substantially parallel to the rail 20. That is, the lens 56 can flip through an angle of approximately 90°. Further pivoting motion of the lens 56 toward the eyes of a wearer is prevented when the frame 58 strikes against the stop 50 on the slide 42.

Other constructions (not shown) for limiting the pivoting motion of the frame assembly 14 can be provided in the spirit of the invention. For example, the cross-section of a pin 60 and the shape of the opening 48 may be adapted to define the limits of pivoting motion.

Additionally, the slide 42 can be translated along the rail 20 as indicated by the double-headed arrow 54. Thus, the spacing of the tinted lens from the eyes of a user is adjustable within the limits defined by the rail 20,22.

In an alternative embodiment (FIGS. 5,6) of a sunglass assembly 10' in accordance with the invention, a mounting bracket 12' is formed with lobes in an S shape. Elements 24',26',40' are similar to the corresponding elements in FIG. 1. The return bend 28' extends substantially equal in length to the rail 24 and a second return bend 62 joins to a rail 20' that extends back toward the return bend 28, and terminates in a turned-up guard 36'.

The grip rail 24', extension 61, and lower rail 20, are substantially coplanar. Grips 38, on the gripping rail 24' serve to engage a visor 11 on the headgear in order to prevent movement of one relative to the other. The extended U-shaped construction, formed by the gripping rail 24', return bend 28', and extension 61, provide a firmer and stronger grip on the visor than is provided by the shorter nib construction of FIGS. 1–4.

A pair of slides 42 and a sunglass frame assembly 14, as described with reference to the first embodiment of FIGS. 1–4, are attached to complete a sunglass assembly 10, in accordance with the invention.

Figure 6:
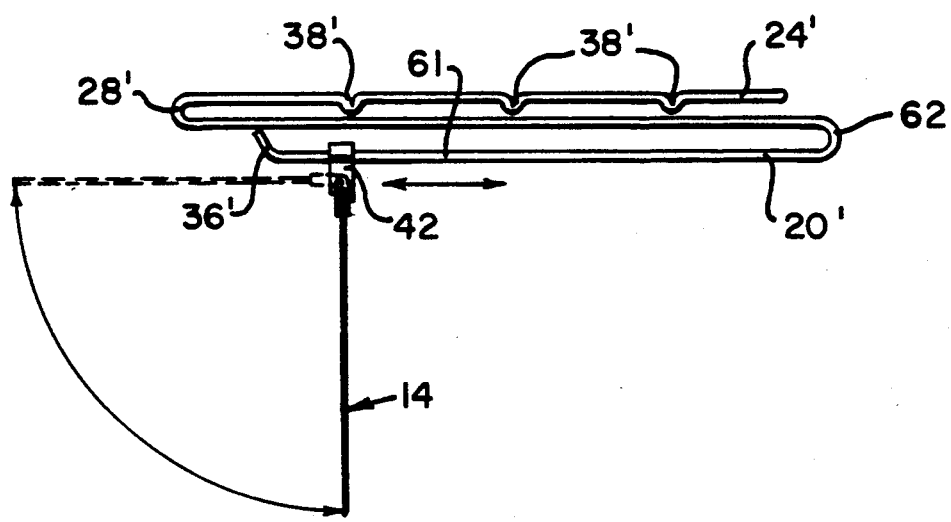
FIG. 6 is a side elevational view of the sunglass assembly of FIG. 5.

As stated above, the sunglass assembly 10,10' can be attached to a visor, as illustrated, or to a peaked cap as indicated by the broken lines 64 in FIG. 5, or to the brim of a hat (not shown).

It will thus be seen that the objects set forth above, and those made apparent from the preceding description, are efficiently attained and, since certain changes may be made in the above constructions without departing from the spirit or scope of the invention, it is intended that all matter contained in the above description, or shown in the accompanying drawings, shall be interpreted as illustrative and not in a limiting sense.

What is claimed is:

1. A sunglass assembly for attachment to a headgear having a front visor comprising;
   mounting means for removable attachment to the headgear visor including,
   a pair of parallel rail means for extending, in use, in a direction of a wearer's frontal line of vision, said rail means being of extended length
   a sunglass member having a tinted transparent portion for viewing therethrough;
   slide means for frictionally and slidingly engaging each said rail means, respectively, and for engaging said sunglass member, said member translating with motion of said slide means along said rail means toward and away from the eyes of the wearer, said slide means being selectively positionable along the length of said rail means, whereby the spacing of said sunglass member from the eyes of a wearer is adjustable.

2. A sunglass assembly as in claim 1, wherein said slide means includes hinge means for pivoting said sunglass member between a first position in which said transparent portion intercepts said line of vision, and a second position in which said transparent portion is tilted substantially out of said line of vision.

3. A sunglass assembly as in claim 2, wherein said means for pivoting include an opening in said slide means and pins mounted to said sunglass member, said pins being pivotably engaged in said openings.

4. A sunglass assembly as in claim 3, wherein said slide means includes a stop for limiting said sunglass member to pivoting motion on said pins through an arc in the order of 90°.

5. A sunglass assembly as in claim 1, wherein said mounting means includes an elongated member formed into a first lobe and a second lobe, said lobes being substantially similar and generally parallel to each other, each said lobe including a U-shaped return bend having two sides with a curved segment joining said sides, a space between said return bend sides being dimensioned to pinchingly receive therein, in use, said visor, whereby said sunglass assembly may releasably grip said headgear.

6. A sunglass assembly as in claim 5, wherein said mounting means is a resilient rod.

7. A sunglass assembly as in claim 6, wherein said rod forming said mounting means is one continuous piece.

8. A sunglass assembly as in claim 7, wherein said rod is of plastic and metal.

9. A sunglass assembly as in claim 5, wherein each said rail is connected at one end thereof to an end away from said return bend of one said lobe side.

10. A sunglass assembly as in claim 9, wherein said one lobe side is approximately equal to the length of the other said side of said U-shaped lobe.

11. A sunglass assembly as in claim 9, wherein the other end of said rail is bent upwardly.

12. A sunglass assembly as in claim 1, wherein said slide means includes a groove, said rail being frictionally and slidingly engaged in said groove.

13. A sunglass assembly as in claim 12, wherein said slide means is resilient plastic, said groove being dimensioned with an interference which permits said rail to be passed into said groove to complete said frictional and sliding engagement.

14. A sunglass assembly as in claim 1, wherein said mounting means includes grip means for engaging a surface of said visor, in use of said sunglass assembly.

15. A sunglass assembly as in claim 1, wherein said sunglass member is generally rigid and maintains spacing between said rail means.

16. A sunglass assembly for attachment to a headgear having a front visor comprising:
   a one-piece springy wire member having a central generally U-shaped mounting portion having substantially parallel leg members and adapted to grip the headgear visor;
   a pair of generally parallel rail means extending back from respective ends of the legs of the generally U-shaped portion and adapted to be adjacent an underside of the headgear visor;
   a sunglass member having a tinted transparent portion for viewing therethrough;
   slide means for frictionally and slidingly engaging each said rail means, respectively, and for engaging said sunglass member, said member translating with motion of said slide means along said rail means toward and away from the eyes of the wearer, said slide means being selectively positionable along the length of said rail means, whereby the spacing of said sunglass member from the eyes of a wearer is adjustable.

* * * * *